United States Patent
He (10) Patent No.: US 8,060,360 B2
(45) Date of Patent: Nov. 15, 2011

(54) WORD-DEPENDENT TRANSITION MODELS IN HMM BASED WORD ALIGNMENT FOR STATISTICAL MACHINE TRANSLATION

(75) Inventor: Xiaodong He, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1020 days.

(21) Appl. No.: 11/980,257

(22) Filed: Oct. 30, 2007

(65) Prior Publication Data

US 2009/0112573 A1    Apr. 30, 2009

(51) Int. Cl.
*G06F 17/27* (2006.01)

(52) U.S. Cl. .................................. 704/9; 704/10; 704/2

(58) Field of Classification Search .................. 704/1–10
See application file for complete search history.

(56) References Cited

U.S. PATENT DOCUMENTS

| | | | |
|---|---|---|---|
| 4,827,521 A | 5/1989 | Bahl et al. | |
| 5,621,859 A | 4/1997 | Schwartz et al. | |
| 5,812,975 A | 9/1998 | Komori et al. | |
| 6,161,083 A | 12/2000 | Franz et al. | |
| 6,182,026 B1* | 1/2001 | Tillmann et al. | 704/2 |
| 6,292,769 B1* | 9/2001 | Flanagan et al. | 704/3 |
| 6,304,841 B1 | 10/2001 | Berger et al. | |
| 6,697,779 B1 | 2/2004 | Bellegarda et al. | |
| 7,209,875 B2 | 4/2007 | Quirk et al. | |
| 7,219,051 B2 | 5/2007 | Moore | |
| 7,239,998 B2 | 7/2007 | Xun | |
| 7,340,388 B2* | 3/2008 | Soricut et al. | 704/4 |
| 2004/0030551 A1 | 2/2004 | Marcu et al. | |
| 2005/0216253 A1 | 9/2005 | Brockett | |
| 2006/0190241 A1* | 8/2006 | Goutte et al. | 704/2 |
| 2007/0083357 A1* | 4/2007 | Moore et al. | 704/4 |
| 2008/0243481 A1* | 10/2008 | Brants et al. | 704/9 |
| 2008/0300857 A1* | 12/2008 | Barbaiani et al. | 704/4 |

OTHER PUBLICATIONS

"Yahoo! Babel Fish—Text Translation and Web Page Translation" retrieved from <http://web.archive.org/web/20061005204237/http://babelfish.yahoo.com/> on Sep. 21, 2010, indexed Oct. 5, 2006.*
Varea et al. "Improving alignment quality in statistical machine translation using context-dependent maximum entropy models" 2002.*
Kumar et al. "Local Phrase Reordering Models for Statistical Machine Translation" 2005.*
Carpuat et al. "Improving Statistical Machine Translation using Word Sense Disambiguation" Jul. 2007.*
Siohan et al. "Joint Maximum a Posteriori Estimation of Transformation and Hidden Markov Model Parameters" 2000.*

(Continued)

*Primary Examiner* — Richemond Dorvil
*Assistant Examiner* — Greg Borsetti
(74) *Attorney, Agent, or Firm* — Lyon & Harr, LLP; Mark A. Watson (57) ABSTRACT

A word alignment modeler uses probabilistic learning techniques to train "word-dependent transition models" for use in constructing phrase level Hidden Markov Model (HMM) based word alignment models. As defined herein, "word-dependent transition models" provide a probabilistic model wherein for each source word in training data, a self-transition probability is modeled in combination with a probability of jumping from that particular word to a different word, thereby providing a full transition model for each word in a source phrase. HMM based word alignment models are then used for various word alignment and machine translation tasks. In additional embodiments sparse data problems (i.e., rarely used words) are addressed by using probabilistic learning techniques to estimate word-dependent transition model parameters by maximum a posteriori (MAP) training.

20 Claims, 5 Drawing Sheets

ALIGNMENT MODEL: CHINESE SOURCE PHRASE TO ENGLISH TARGET PHRASE

OTHER PUBLICATIONS

Blunsom et al. "Discriminative Word Alignment with Conditional Random Fields" Jul. 2006.*
Barbaiani et al. "Asymmetric Term Alignment with Selective Contiguity Constraints by Multi-Tape Automata" Sep. 24, 2007.*
DeNero et al. "TailoringWord Alignments to Syntactic Machine Translation" Jun. 23-30, 2007.*
Al-Onaizan et al. "Distortion Models for Statistical Machine Translation" Jul. 2006.*
Cherry et al. "A Probability Model to Improve Word Alignment" Jul. 2003.*
Deng et al. "HMM Word and Phrase Alignment for Statistical Machine Translation" 2005.*
Zhao et al. "Inner-Outer Bracket Models for Word Alignment using Hidden Blocks" 2005.*
Deng, et al., "HMM Word and Phrase Alignment for Statistical Machine Translation", Human Language Technology Conference, Date: 2005, pp. 169-176, Association for Computational Linguistics, Morristown, NJ, USA.
Brown, et al., "The Mathematics of Statistical Machine Translation: Parameter Estimation", Date: 1993, vol. 19, No. 2, pp. 263-311, Computational Linguistics.
Deng, et al., "HMM Word and Phrase Alignment for Statistical Machine Translation", Proceedings of Human Language Technology Conference and Conference on Empirical Methods in Natural Language, Date: Oct. 2005, pp. 169-176, Trumpington Street, Cambridge, UK.
Franz Josef Och, "Minimum Error Rate Training in Statistical Machine Translation", Date: Jul. 2003, pp. 160-167, University of Southern California, CA.
Gauvain, et al., "Maximum a Posteriori Estimation for Multivariate Gaussian Mixture Observations of Markov Chains", Date: Apr. 1994, vol. 2, No. 2.
Koehn, et al., "Statistical Phrase-Based Translation", Proceedings of the 2003 Conference of the North American Chapter of the Association for Computational Linguistics on Human Language Technology—vol. 1, Date: 2003, pp. 48-54.
L. R. Rabiner, "A Tutorial on Hidden Markov Models and Selected Applications in Speech Recognition". Date: Feb. 1989, vol. 77, Issue: 2, p. 257-286.
Liang, et al., "Alignment by Agreement", Proceedings of the Human Language Technology Conference of the North American Chapter of the ACL, Date: Jun. 2006, pp. 104-111, Berkeley, CA.
Moore, et al., "Improved Discriminative Bilingual Word Alignment", Proceedings of the 21st International Conference on Computational Linguistics and the 44th annual meeting of the ACL, Date: 2006, pp. 513-520.
Och, et al., "A Comparison of Alignment Models for Statistical Machine Translation", Proceedings of the 18th conference on Computational linguistics—vol. 2, Date: 2000, pp. 1086-1090, Association for Computational Linguistics, USA.
Och, et al., "Discriminative Training and Maximum Entropy Models for Statistical Machine Translation", Proceedings of the 40th Annual Meeting on Association for Computational Linguistics, Date: 2001, pp. 295-302, Association for Computational Linguistics, USA.
Och, et al., "Improved Statistical Alignment Models", Proceedings of the 38th Annual Meeting on Association for Computational Linguistics, Date: 2000, pp. 440-447.
Papineni, et al., "Bleu: A Method for Automatic Evaluation of Machine Translation", Proceedings of the 40th Annual Meeting on Association for Computational Linguistics, Date: 2001, pp. 311-318, Association for Computational Linguistics, USA.
Toutanova, et al., Extensions to HMM-based Statistical Word Alignment Models, Proceedings of the ACL-02 conference on Empirical methods in natural language processing—vol. 10, Date: 2002, pp. 87-94, Association for Computational Linguistics, USA.
Vogel, et al., "HMM-Based Word Alignment in Statistical Translation", Proceedings of the 16th conference on Computational linguistics—vol. 2, Date: 1996, pp. 836-841, Association for Computational Linguistics, USA.
Zhang, et al., "Stochastic Lexicalized Inversion Transduction Grammar for Alignment", Proceedings of the 43rd Annual Meeting on Association for Computational Linguistics, Date: 2005, pp. 475-482, Association for Computational Linguistics, USA.
Koehn., "Pharaoh: A Beam Search Decoder for Phrase Based Statistical Machine Translation Models. In Proceedings of AMTA".2004b.
F. J. Och and H. Ney. 2000c. "Giza++: Training of statistical translation models.", http://www.fjoch.com/GIZA++.html.

* cited by examiner

WORD-DEPENDENT TRANSITION MODELS IN HMM BASED WORD ALIGNMENT FOR STATISTICAL MACHINE TRANSLATION

BACKGROUND

1. Technical Field

The invention is related to statistical word translation, and in particular, to various techniques for learning probabilistic models for use in machine translation of words, phrases or sentences in one language to another language, or to alternate words, phrases or sentences in the same language.

2. Related Art

Word alignment is an important step in typical approaches to statistical machine translation. In machine translation, it is generally assumed that there is a pair-wise mapping between the words of a source sentence in a first language and a target sentence in a second language. This mapping is typically generated using probabilistic word alignment modeling. A number of classical approaches to word alignment are based on Hidden Markov Model (HMM) based alignment models.

Although HMM based word alignment approaches generally provide good translation performance, one weakness of conventional HMM based approaches is the use of coarse transition models which generally assume that word transition probabilities depend only on a jump width from a last model state to a next model state. Several translation schemes have attempted to improve transition models in HMM based word alignment by extending word transition models to be word-class dependent. Related schemes have modeled self-transition probability separately from other transition probabilities to address cases where there is no analog for a particular word in the language to which a phrase is being translated. Further adaptations of such schemes include using a word-to-phrase HMM in which a source word dependent phrase length model is used to improve translation results.

Unfortunately, these types of translation schemes generally model the probability of state occupancy (self-transition) rather than a full set of transition probabilities. As such, important knowledge of jumping from a particular source word to another position, e.g., jumping forward (monotonic alignment) or jumping backward (non-monotonic alignment), is not modeled. Further, these types of translation schemes do not adequately address the problem of data sparsity in detailed word transition modeling.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A "word alignment modeler" provides various techniques for learning probabilistic "word-dependent transition models" from training data consisting of known parallel sentence or phrase data in source and target languages. As defined herein the learned "word-dependent transition models" provide a probabilistic model wherein for each unique source word in the training data, a self-transition probability is modeled in combination with a probability of jumping from that particular word to a different word.

The training data used for learning the word-dependent transition models typically comprises large numbers of pairs of known parallel phrases. One example of parallel text training data is the well known "Hansard Corpus" which consists of parallel texts in English and Canadian French, drawn from official records of the proceedings of the Canadian Parliament over a period of years. Given such data, either one or two sets of word-dependent transition models are learned: one set representing English to French alignments (assuming English source words and French targets) and one representing French to English alignments (assuming French source words and corresponding English targets). One advantage of learning both sets of word-dependent transition models from the training data is that each language can be represented as either a source or a target, thereby allowing alignments from either language as a source to the other language as a target.

In general, the word alignment modeler then uses the learned word-dependent transition models to construct phrase-level Hidden Markov Model (HMM) based word alignment models for use in various word alignment and phrase-based machine translation tasks. Such tasks include, for example, word alignment tasks, and translating phrases or sentences from one language (i.e., a "source phrase") to a corresponding "target phrase" in another language. Similarly, a source phrase in one language can also be aligned to an alternate phrase or sentence in the same language given appropriate training of the word-dependent transition models.

More specifically, the automatically learned word-dependent transition models are used to construct HMM-based word alignment models, such that for each word in a source phrase, both a self-transition probability (i.e., the probability that a particular word in a source phrase maps or "aligns" to two or more words in a target phrase) and a probability of jumping from a specific source word to a different source word are modeled, thereby providing a full transition model for each word in the source phrase.

Further, in order to enhance alignment performance, in one embodiment, two passes of word alignment are preformed: from source to target and from target to source, using the appropriate set of word-dependent transition models for each source. Heuristics are then used to combine these two word alignments to produce a final word-to-word mapping between a source sentence or phrase and a target sentence or phrase. Separate HMM based alignment models are used for each of these two passes, with the one being constructed on the source phrase to emit observations of the target phrase, and the other being constructed on the target side to emit observations of the source phrase, respectively.

In addition, data sparsity problems (i.e., rarely used words in the training data) in word-dependent transition modeling are addressed by using probabilistic learning techniques, such as, for example, Bayesian learning, to estimate word-dependent transition model parameters by maximum a posteriori (MAP) training to provide more robust word-dependent transition models.

In view of the above summary, it is clear that the word alignment modeler described herein provides a variety of unique techniques for enabling and improving machine translation tasks. In addition to the just described benefits, other advantages of the word alignment modeler will become apparent from the detailed description that follows hereinafter when taken in conjunction with the accompanying drawing figures.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

1.0 Introduction:

In general, a "word alignment modeler," as described herein, provides various techniques for probabilistic training or learning of Hidden Markov Models (HMM), which include novel full word-dependent transition models in combination with other conventional HMM components (such as probabilistic word emission models). Note that word emission models for use in HMMs are known to those skilled in the art, and will not be described in detail herein. Initial training of these word-dependent transition models is performed using sets of training data comprising known parallel phrases (i.e., matched phrase or sentences having approximately the same meaning). The resulting word-dependent transition models and other HMM components are then used to construct phrase level HMM based word alignment models for enabling various word alignment and phrase-based machine translation tasks. These tasks include, for example, word alignment tasks and translating phrases or sentences from one language to another language, or from one language to alternate phrases or sentences in the same language.

An example of training data used to train the word-dependent transition models for aligning phrases from English to French, or separately, from French to English, is the well known Hansard Corpus which consists of parallel texts in English and Canadian French, drawn from official records of the proceedings of the Canadian Parliament over a period of years. Clearly, similar training data represented by parallel texts in other languages would be used to train the word-dependent transition models depending upon which language pairs are to be translated.

In other words, the word alignment modeler uses one or more sets of known parallel texts to automatically learn full word-dependent transition models for particular language pairs (i.e., English to French, Chinese to English, German to Italian, etc.). These learned word-dependent transition models are then used to construct HMM based word alignment models for use in aligning new parallel sentence pairs wherein one or more words (or nulls) comprising a source sentence (or phrase) in one language is "aligned" to one or more words (or nulls) comprising a target sentence (or phrase) in another language.

Note that as is known to those skilled in the art of machine translation, a "null" is generally considered to represent the case where a word in a target phrase does not have an equivalent in the language of the source phrase (or vice versa). An example of this concept is that the word "the" in the English language does not have an equivalent word in the Chinese language. This idea is further addressed below in Section 1.3 with respect to the discussion of FIG. 1.

1.1 System Overview:

As noted above, the word alignment modeler provides various techniques for aligning a source phrase to a target phrase using learned word-dependent transition models in HMM based probabilistic word alignment models. More specifically, as described in greater detail in Section 2, the word alignment modeler uses various probabilistic learning techniques to automatically learn novel word-dependent transition models, in combination with other conventional HMM components such as word emission models, to construct HMM based word alignment models. The resulting HMM based word alignment models operate such that each word or null in a source phrase aligns to one or more words in a target phrase via the learned HMM based alignment model of the source phrase so that each word or null of the source phrase "emits" one or more words of the corresponding target phrase.

In other words, the probabilistically learned word-dependent transition model for each word provides both a self-transition probability (i.e., the probability that a particular word in a source phrase maps to two or more words in a target phrase) and a probability of jumping from a specific word of the source phrase to another specific word of the source phrase. In additional embodiments, the word alignment modeler addresses data sparsity problems in word-dependent transition modeling by using probabilistic learning techniques, such as, for example, Bayesian learning, to estimate word-dependent transition model parameters by maximum a posteriori (MAP) training.

Further, in order to enhance alignment performance, in one embodiment, two passes of word alignment are preformed: from source to target and from target to source, using the appropriate set of word-dependent transition models for each source. Heuristics are then to combine these two word alignments to produce a final word-to-word mapping between a source sentence or phrase and a target sentence or phrase. Separate HMM based alignment models are used for each of these two passes, with the one being constructed on the source phrase to emit observations of the target phrase, and the other being constructed on the target side to emit observations of the source phrase, respectively.

In various embodiments source phrases and or sentences can be read from an existing document or file, entered by a user using conventional text input devices, entered by a user using conventional voice recognition techniques to enable verbal phrase entry, or recovered from an image of text data using conventional optical character recognition (OCR) techniques. In any case, once the source sentences or phrases have been entered, the word alignment modeler constructs HMM-based word alignment models for each phrase from the learned word-dependent transition models in combination with conventional HMM components (such as word emission models), and then uses these word alignment models for aligning source phrases to target phrases. As noted above, the source and target phrases are either in different languages, or in the same language.

In the case where the source and target phrases are in different languages, the alignment of the source phrase to the target phrase has the effect of translating the source phrase from a first language into a corresponding target sentence in a second language. A simple example of such an alignment would be to produce a translation from an English source phrase to a French target phrase. Again, it should be noted that the word-dependent transition models and other HMM components are learned offline using a training data set, such as, for example, the well known Hansard Corpus, then applied to align a new source phrase to a target phrase entered or otherwise selected by a user.

In the case where the source and target phrases are in the same language, the alignment of the source phrase to the target phrase has the effect of creating an alternate version of the source phrase in the same language as the source phrase. A simple example of this type of same language phrase alignment would be to produce a target phrase from the source phrase where some or all of the words in the target phrase are approximately synonymous to aligned words in the source phrase. In this case, initial word-dependent transition model training would use a same-language equivalent of the Hansard Corpus, or the like, or be can constructed using other learning methods However, it should also be noted that word alignment can be used for tasks other that translation tasks. For example computing alignments from a source phrase to a target phrase enables tasks such as, for example, search query mapping; natural language translations; voice recognition based tasks, etc.

1.3 Word Alignment Example:

In general, in conventional HMM based word alignments, the HMM models each word in the source phrase as either a model state or a null, with the jump from one state to another state simply depending upon jump distances (i.e., a distance from one state to another in the HMM).

In contrast, given an appropriate training data set (such as the Hansard Corpus), the word alignment modeler creates word-dependent transition models for the HMM based word alignment model wherein jumps depend not only upon jump distance, but also upon the specific word from which the jump is taking place. In other words, transition models learned by the word alignment modeler probabilistically model jumps (both forward and backward) and self jumps (see discussion below) in combination with a probability of a jump from a specific current word (i.e., the current HMM model state) to another specific word (i.e., the next HMM model state). These unique transition models are described herein using the term "word-dependent transition models."

Figure 1:
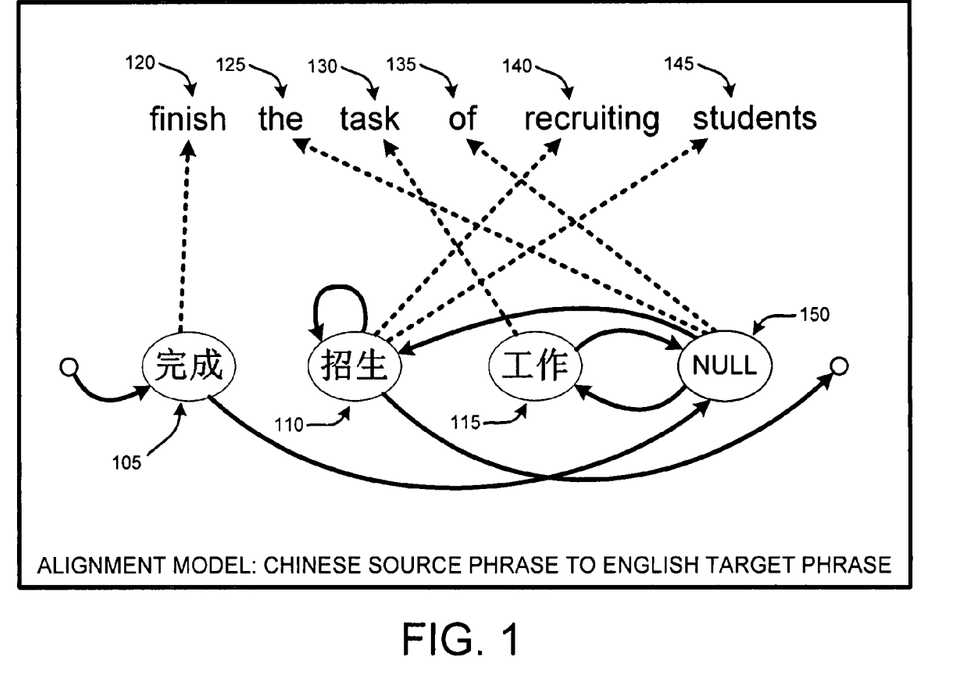
FIG. 1 provides an exemplary Hidden Markov Model (HMM) based word alignment model showing jumps made in an alignment between a Chinese source phrase and an English target phrase, thereby providing a probabilistic alignment between the Chinese phrase and the corresponding English phrase, as described herein.

In general, FIG. 1 provides a simple example of word alignment between a parallel sentence pair of corresponding English and Chinese sentences, given initial word-dependent transition model training using known English-Chinese parallel text data.

In particular, as illustrated by FIG. 1, a Chinese source phrase, "wancheng zhaosheng gongzuo" denoted by Chinese characters " 完成 招生 工作 "(characters 105, 110, and 115, respectively), aligns to a target English phrase "finish the task of recruiting students" (words 120, 125, 130, 135, 140, and 145, respectively). As illustrated by FIG. 1, the HMM based word alignment model is built on the source side (i.e., the Chinese phrase in this example), while observations are built on the target side (i.e., the English phrase in this example).

In an example of the case where two passes of word alignment are preformed to enhance alignment results, the first pass of HMM based modeling would be from the Chinese source phrase to the corresponding English target phrase. Next, the resulting English target phrase would then be used as a source phrase in a second pass of HMM based modeling for aligning the English phrase to a Chinese target phrase. The results of these two passes are generally not in perfect agreement due to the probabilistic nature of the HMM based alignment process. Therefore, in one embodiment, the results of the two passes are combined using heuristic modeling techniques to produce a final word-to-word mapping between a source sentence or phrase (in this case, the Chinese phrase) and a target sentence or phrase (in this case, the English phrase).

Note that alignments are not necessarily one-to-one. For example, while the Chinese phrase consists of three words (105, 110, and 115), the English phrase consists of six words (120, 125, 130, 135, 140, and 145). Consequently, the HMM based alignment model used to align a source phrase to a target phrase will generally be represented by various combinations of:

Alignments from a word in the source phrase to a word in the target phrase (i.e., 105 aligns to 120);

Jumps from a word in the source phrase to a "null" (i.e., 105 to 150) where a word such as "the" in the target phrase does not have an equivalent in the language of the source phrase;

Jumps from the null to a word in the source phrase (i.e., 150 to 110);

Self jumps from a word in the source phrase to itself (i.e., 110 to 110), where the word in the source phrase (110) aligns to two or more words (140 and 145) in the target phrase; and Jumps (either forward or backwards) from one word in the source phrase to another word in the source phrase (not illustrated in FIG. 1 due to the relatively short length of the source phrase in this example).

In view of the jumps illustrated in the HMM-based word alignment model of FIG. 1, evaluation of the HMM-based word alignment model results in a probabilistic alignment of the Chinese phrase to the English phrase, as follows:

First, there is a jump into the first state in the HMM based alignment model to characters " 完成 "105 in the Chinese source phrase, which align to the word "finish" 130 in the English target phrase.

Next, since there is no equivalent to the word "the" 125 in the Chinese language, the HMM jumps from characters " 完成 "105 to the null 150.

Then, the HMM jumps from the null 150 to the characters " 工作 "115, which aligns to the word "task" 130.

Next, since there is no equivalent to the word "of" 135 in the Chinese language, the HMM makes a jump from the characters " 工作 "115 back to the null 150.

From the null 150, the HMM then jumps to the characters " 招生 "110, which aligns to the word "recruiting" 140, and which then self jumps since it also aligns to the word "students" 145 in the English target phrase.

Finally, since the alignment is complete at this point, there is a jump out of the HMM from characters " 招生 "110.

Figure 2:
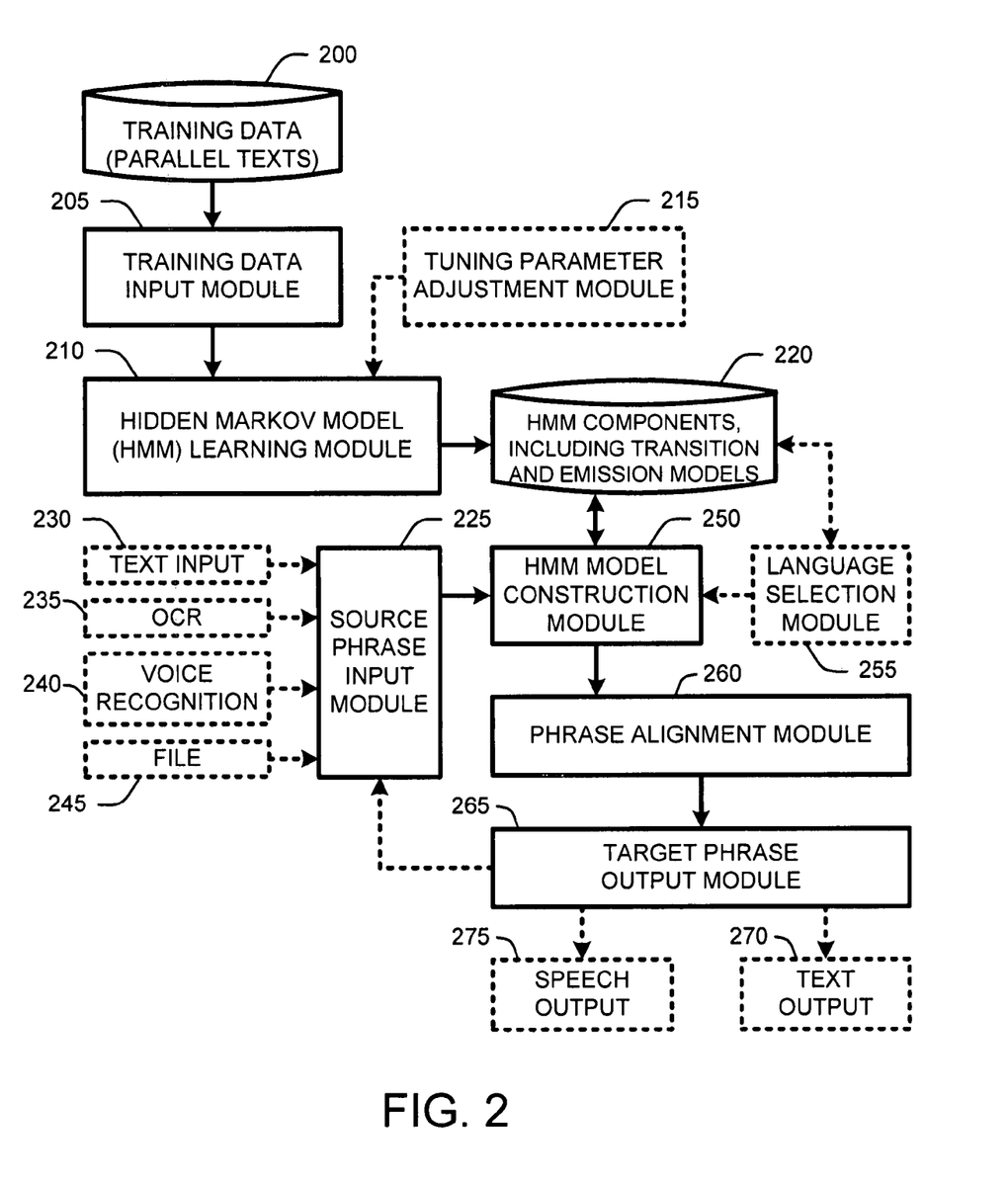
FIG. 2 provides an exemplary architectural flow diagram that illustrates program modules for implementing various embodiments of a word alignment modeler, as described herein.

1.2 System Architectural Overview:

The processes summarized above are illustrated by the general system diagram of FIG. 2. In particular, the system diagram of FIG. 1 illustrates the interrelationships between program modules for implementing various embodiments of the word alignment modeler, as described herein. It should be noted that any boxes and interconnections between boxes that are represented by broken or dashed lines in FIG. 2 represent alternate embodiments of the word alignment modeler described herein, and that any or all of these alternate embodiments, as described below, may be used in combination with other alternate embodiments that are described throughout this document.

In general, as illustrated by FIG. 2, various embodiments of the word alignment modeler begin operation by receiving one or more sets of training data 200 via a training data input module 205. As noted above, each training data set represents a pair of known parallel texts, such as the aforementioned Hansard Corpus, comprising matching or parallel sentences or phrases in a desired source language and a desired target language.

Once the training data input module 205 receives the training data 200, that training data is passed to a HMM model learning module 210. In general, the HMM model learning module 210 models each word in the training data set by automatically learning probabilistic models (i.e., word-dependent transition models along with other HMM components such as word emission models 220) for each word. The probabilistic word-dependent transition models in 220 represent full word-dependent transition probability distributions that are word dependent. In other words, when used to construct the HMM based alignment model, as discussed in further detail below, these word-dependent transition models 220 are designed such that the probability of jumping from state A in the HMM based word alignment model to state B in the model depends not only on an alignment of a word represented by state A to a corresponding word in the source phrase, but also depends on the particular word represented by state A in the HMM based word alignment model. Note that this concept is discussed in further detail in Section 2.3 with respect to Equation (8).

Further, in one embodiment, a tuning parameter adjustment module 215 is used to improve word-dependent transition models for the case where the training data 200 includes sparse (i.e., rarely used) words. In particular, as discussed in further detail in Section 2.4.2, the tuning parameter adjustment module 215 is used to apply a weak prior distribution for each sparse word such that the learned word-dependent transition model for each such word is more dependent on the weak prior. In other words, as described in further detail in Section 2.4.2, the tuning parameter is varied to control the contribution of the prior distribution in model training in order to tune word alignment performance of the corresponding word-dependent transition model.

Note that the aforementioned training (i.e., learning of the word-dependent transition models 220) can be computed both ways for each language in the training data 200, such that each of the two languages in the training data can represent either the source language or the target language for subsequent machine translation tasks. Once the training has been completed, and the word-dependent transition models 220 are learned for each word in the training data 200, the word alignment modeler stores those word-dependent transition models for later use. However, it is only necessary to train one set of word-dependent transition models 220 to align a desired source phrase to a desired target phrase.

Given the learned word-dependent transition models 220, the word alignment modeler then continues operation by receiving a source phrase (in the desired source language) that is input via a source phrase input module 225. In general, the source phrase is a sentence or phrase represented by a text string in the desired source language. Input of this text string can be accomplished in a number of conventional ways, such as, for example, via user text input 230 using a text input device, such as a keyboard or the like, via OCR 235 of an image of text data; by converting a voice input to text via conventional voice recognition 240 techniques, or by reading in an existing text file 245 or document (such as, for example, an Internet web page or other text-based document).

Next, given the source phrase, the word alignment modeler uses a HMM model construction module 250 to construct a phrase level HMM based word alignment model using the source phrase and the learned word-dependent transition models and other HMM components 220. In general, this word alignment model is built on the source phrase side, such that the known source phrase will emit the probabilistic target phrase once the word alignment model is evaluated. Specifically, once the HMM based word alignment model is constructed, it is passed to a phrase alignment module 260 which effectively aligns the source phrase to the target phrase by identifying the highest probability target phrase that will be emitted or observed from an evaluation of the HMM based alignment model of the source phrase. See Sections 2.2 through 2.4 for further details regarding these points.

Note that in one embodiment, there may be word-dependent transition models available for multiple languages, depending upon the training data 200 that was provided for training purposes, as described above. In this case, a language selection module 255 is used to select the particular source and target languages that are to be used.

Once the phrase alignment module 250 has evaluated the HMM based alignment model, the resulting target phrase is provided to a target phrase output module 265 to be output. In the simplest case, only alignment data between the source phrase and the resulting target phrase is provided by the target phrase output module 265. However, in another embodiment, the target phrase is provided as a text output 270. For example, in the case of a web page used to provide source phrase inputs, each source phrase input of the original web page would be used in constructing a new web page where each source phrase of the original web page is replaced with a corresponding target phrase, thereby translating the original web page from a first language to second language. In yet another embodiment, the target phrase is output as a voice or speech output 275 by using conventional voice synthesis techniques to render a voice approximation of the text string represented by the target phrase.

Finally, in another embodiment, the target phrase provided via the target phrase output module 265 is provided back to the source phrase input module 225 as a new source phrase input. This embodiment is useful for enabling multi-stage machine translation tasks. For example, assume that training data 200 is available to learn word-dependent transition models 220 for aligning English to French phrases, and French to German phrases. If there is no training data 200 available for learning word-dependent transition models 220 for use in directly aligning English to German phrases, then English source phrases can be aligned to French target phrases, with those French target phrases then being used as new source phrases for a subsequent alignment to German target phrases. The result is a two stage alignment from English source phrases to German target phrases. Clearly, any number of stages can be used here, depending upon the available training data 200.

2.0 Operation Overview:

The above-described program modules are employed for implementing various embodiments of the word alignment modeler. As summarized above, the word alignment modeler provides various techniques for learning probabilistic word-dependent transition models for use in aligning a source phrase to a target phrase via phrase level HMM based word alignment models. The following sections provide a detailed discussion of the operation of various embodiments of the word alignment modeler, and of exemplary methods for implementing the program modules described in Section 1 with respect to FIG. 2.

2.1 Operational Details of the Word Alignment Modeler:

In general, initial training of word-dependent transition models is based on one or more sets of training data comprising parallel texts in two languages of interest. As noted above, one example a data set comprising two different languages is the well known Hansard Corpus which consists of parallel texts in both English and Canadian French. Again, it should be noted that the two languages can be the same language so long as each text includes parallel sentences.

The following sections describe training and use of word-dependent transition models that are trained using these types of parallel text data sets. For example, in a tested embodiment, a selection of about 500,000 parallel sentences from the Hansard Corpus was used to train two separate sets of word-dependent transition models for both English to French translations and French to English translations. Each case is handled separately, with source phrases (in the language from which source phrases will be translated) being used to construct the HMM based word alignment models which then emit the corresponding target phrases.

The following paragraphs detail specific operational and alternate embodiments of the word alignment modeler described herein. In particular, the following paragraphs describe details of the word alignment modeler operation, including: HMM based word alignment using transition models and emission models; word-dependent transition models for use with HMM based word alignment; and probabilistic learning for word-dependent transition models.

2.2 Overview of HMM Based Word Alignment Models:

Conventional HMM based word alignment models include states that indicate (position, word) pairs from which a word in one language results in a corresponding word in another language (or an alternate word, such as a synonym, in the same language). For example, consider a French language phrase having J words, denoted by $f_1^J=(f_1, \ldots, f_J)$, with subscripts $(1, \ldots, J)$ indicating a position of each word in the phrase. Similarly, a corresponding English language phrase, having I words is denoted by $e_1^I=(e_1, \ldots, e_I)$. Then, $a_1^J = (a_1, \ldots, a_J)$ represents an alignment that specifies a position of each English word relative to each corresponding French word when translating the French phrase into a corresponding English phrase.

Note that the number of words in a phrase in one language may differ from the number of words in a corresponding phrase in another language. Consequently, in the above example, there is no requirement for the number of French words, J, to equal the number of English words, I.

Given this basic setup, and assuming a translation from the English sentence into the French sentence, using HMM based word alignment, a HMM is built at English side, i.e., each (position, word) pair, $(a_j, e_{a_j})$, is a probabilistic HMM state, which emits the French word $f_j$. In conventional techniques, in order to mitigate the sparse data problem, it is assumed that the emission probability of the French word $f_j$ only depends on the corresponding English word, i.e., $p(f_j|a_j, e_{a_j})=p(f_j|e_{a_j})$, and the transition probability only depends on the position of the last state and the length of the English sentence, i.e., $p(a_j|a_{j-1}, e_{a_j}, I)=p(a_j|a_{j-1}, I)$. This assumption gives rise to the following probabilistic formulation for translating a French sentence to an English sentence:

$$p(f_1^J | e_1^I) = \sum_{a_1^J} \prod_{j=1}^{J} [p(a_j | a_{j-1}, I) p(f_j | e_{a_j})] \qquad \text{Equation (1)}$$

Conventional HMM-based word transition modeling further assumes that the transition probabilities, $p(a_j=i|a_{j-1}=i', I)$, depend only on a jump width (i−i'), as illustrated by Equation 2, where:

$$p(i | i', I) = \frac{c(i - i')}{\sum_{l=1}^{I} c(l - i')} \qquad \text{Equation (2)}$$

Therefore, conventional transition probabilities, $p(a_j|a_{j-1}, I)$, depend on $a_{j-1}$, but only through a distortion set $\{c(i-i')\}$.

As noted above, a sentence or phrase in one language may not have the same number of words when translated to another language. Therefore, a "null" word is used to generate a word in the target language that does not correspond to a word in the sentence in the first language. In other words, using the English to French translation example cited above, a null word in the English language would correspond to a French word that doesn't align to any English words. Therefore, if the position of the last French word before j that aligns to a non-null English word is denoted by j_, then the transition probabilities $p(a_j=i|a_{j-1}=i', I)$ in Equation (1) are computed as $p(a_j=i|a_{j\_}=i', I)=\tilde{p}(i|i', I)$, where:

$$\tilde{p}(i | i', I) = \begin{cases} p_0 & \text{if } i = 0 \\ (1 - p_0) \cdot p(i | i', I) & \text{otherwise} \end{cases} \qquad \text{Equation (3)}$$

where state i=0 denotes the state of a null word at the English side, and $p_0$ is the probability of jumping to state 0, which is estimated from hold-out data.

For purposes of explanation, the HMM parameter set, Λ, of the model is denoted by $\Lambda=\{p(i|i', I), p(f_j|e_i)\}$. Then, when training a conventional HMM based transition model, the model parameters, Λ, are usually estimated through maximum likelihood (ML) training, as illustrated by Equation 4, where:

$$\Lambda_{ML} = \operatorname*{argmax}_{\Lambda} p(f_1^J | e_1^I, \Lambda) \qquad \text{Equation (4)}$$

and where an efficient Expectation-Maximization algorithm can be used to optimize Λ iteratively until convergence.

More specifically, the transition probabilities $\{p(i|i', I)\}$ are a multinomial distribution estimated according to Equation (2), where at each iteration the distortion set $\{c(i-i')\}$ is the fractional count of transitions having a jump width d=i−i', such that the distortion parameters are computed as illustrated by Equation 5:

$$c(d) = \sum_{j=1}^{J-1} \sum_{i=1}^{I} Pr(a_j = i, a_{j+1} = i + d | f_1^J, e_1^I, \Lambda') \qquad \text{Equation (5)}$$

where Λ' is the model obtained from the immediate previous iteration, and where the terms in Equation (5) can be efficiently computed by using a conventional Forward-Backward algorithm. In practice, the distortion parameters {c(d)} are bracketed into buckets.

For example, in a tested embodiment, 15 buckets were used for computing {c(d)}, where the 15 buckets included c($\leq$-7),c(-6), ... c(0), ..., c($\geq$7). The probability mass for transitions having a jump width larger than 6 is uniformly divided. In addition two separate sets of distortion parameters were used for transitioning into the first state of the HMM model, and for transitioning out of the last state of the HMM model, respectively. Finally, in one embodiment, transition probabilities with a uniform distribution are further smoothed as illustrated by Equation (6):

$$p'(a_j | a_{j_-}, I) = \alpha \cdot \frac{1}{I} + (1-\alpha) \cdot p(a_j | a_{j_-}, I) \quad \text{Equation (6)}$$

Finally, after training, Viterbi decoding is used to find a best alignment sequence, $\hat{a}_1^J$, as illustrated by Equation (7):

$$\hat{a}_1^J = \underset{a_1^J}{\operatorname{argmax}} \prod_{j=1}^{J} \left[ p(a_j | a_{j_-}, I) p(f_j | e_{a_j}) \right] \quad \text{Equation (7)}$$

2.3 Word-Dependent Transition Models:

As noted above, the word alignment modeler provides word-dependent transition models for use with HMM based alignment models. However, conventional transition models that only depend on source word positions (i.e., the (position, word) pairs described in Section 2.2) are generally not as accurate as might otherwise be desired. In fact, as described in Section 2.2, there are only limited distortion parameters to model the transition between HMM states for all words in a particular language, and the knowledge of transition probabilities given a particular source word is not represented.

Therefore, in order to improve the transition model in HMM based translation scenarios, the word alignment modeler extends transition probabilities to be word-dependent so that the probability of jumping from state $a_{j_-}$ to $a_j$ not only depends on $a_{j_-}$, but also depends on the particular word at position $a_{j_-}$. Thus, going back to the English to French translation example described above, the new probabilistic formulation can be illustrated by Equation (8), where:

$$p(f_1^J | e_1^I) = \sum_{a_1^J} \prod_{j=1}^{J} \left[ p(a_j | a_{j_-}, e_{a_{j_-}}, I) p(f_j | e_{a_j}) \right] \quad \text{Equation (8)}$$

In contrast to Equation (1), it can be seen that in Equation (8), the word alignment modeler estimates the transition parameter $p(a_j | a_{j_-}, e_{a_{j_-}}, I)$ which is $e_{a_{j_-}}$ dependent. Consequently, the HMM parameter set, $\Lambda$, that must be estimated are given by $\Lambda = \{p(i|i', e_{i'}, I), p(f_j|e_i)\}$, which provides a much richer set of free parameters to model transition probabilities than do conventional transition models as described above in Section 2.2.

2.4 Probabilistic Learning for Word-Dependent Transition Models:

In general, a number of probabilistic learning techniques can be applied for learning probabilistic models. In one embodiment, the word alignment modeler uses Bayesian learning techniques including Maximum a Posteriori (MAP) training for learning the word-dependent transition models.

2.4.1 Maximum a Posteriori Training:

Using Maximum Likelihood (ML) training, an estimation formula for word dependent transition probabilities, {p(i|i', e, I)}, similar to Equation (2) can be derived, as illustrated by Equation (9), where:

$$p_{ML}(i | i', e, I) = \frac{c(i - i'; e)}{\sum_{l=1}^{I} c(l - i'; e)} \quad \text{Equation (9)}$$

where at each training iteration a word dependent distortion set {c(i–i'; e)} is computed as illustrated by Equation (10), where:

$$c(d; e) = \quad \text{Equation (10)}$$
$$\sum_{j=1}^{J-1} \sum_{i=1}^{I} \delta(e_{a_j} = e) Pr(a_j = i, a_{j+1} = i + d | f_1^J, e_1^I, \Lambda')$$

where d=i–i' is the jump width, and $\delta(e_{a_j}=e)$ is a Kronecker delta function that equals one if $e_{a_j}=e$, and zero otherwise.

However, for many non-frequent or sparse words (i.e., words that are rarely used), the data samples for c(d; e) are very limited. If not addressed, this problem can lead to a biased model that severely over fits to the sparse data. Therefore, in one embodiment, in order to address this issue, a maximum a posteriori (MAP) framework is applied. Specifically, in MAP training, an appropriate prior distribution, g, is used to incorporate prior knowledge into the model parameter estimation, as illustrated by Equation (11):

$$\Lambda_{MAP} = \underset{\Lambda}{\operatorname{argmax}} p(f_1^J | e_1^I, \Lambda) g(\Lambda | e_1^I) \quad \text{Equation (11)}$$

where the prior distribution, $g(\Lambda | e_1^I)$, characterizes the distribution of the model parameter set $\Lambda$ given the English sentence (or sentence in any other language). The relation between ML and MAP estimation is through the Bayes' theorem where the posterior distribution $p(\Lambda | f_1^J, e_1^I) \propto p(f_1^J | e_1^I, \Lambda) g(\Lambda | e_1^I)$, and where $p(f_1^J | e_1^I, \Lambda)$ is the likelihood function.

In word-dependent transition model estimation, the transition probabilities {p(i|i', e_{i'}, I)} are a multinomial distribution. The conjugate prior distribution of these transition probabilities is a Dirichlet distribution taking the form illustrated by Equation (12), where:

$$g(p(i | i', e_{i'}, I) | e_1^I) \propto \prod_{i=1}^{I} p(i | i', e_{i'}, I)^{v_{i',i}-1} \quad \text{Equation (12)}$$

where $\{v_{i',i}\}$ is a set of hyper-parameters of the prior distribution. Note that for mathematical tractability, the hyper-parameters, $v_{i',i}$, should to be greater than 1, which is typically the case in practice.

Finally, an iterative MAP training formula for the word-dependent transition models used in various embodiments of the word alignment modeler is derived by substituting Equation (12) into Equation (11), and applying an Expectation-Maximization (EM) algorithm, as illustrated by Equation (13), where:

$$p_{MAP}(i|i', e, I) = \frac{c(i-i'; e) + v_{i',i} - 1}{\sum_{l=1}^{I} c(l-i'; e) + \sum_{l=1}^{I} v_{i',l} - I} \quad \text{Equation (13)}$$

2.4.2 Setting Hyper-Parameters for the Prior Distribution:

In typical Bayesian learning, the hyper-parameter set $\{v_{i',i}\}$ of the prior distribution is assumed to be known based on a subjective knowledge about the model. In contrast, in various embodiments, the word alignment modeler sets the prior distribution with word-independent transition probabilities as illustrated by Equation (14), where:

$$v_{i',i} = \tau \cdot p(i|i', I) + 1 \quad \text{Equation (14)}$$

where $\tau$ is a positive parameter that is used to tune a hold-out data set, as discussed in further detail below.

Next, substituting Equation (14) into Equation (13), the MAP based word-dependent transition model training formula is derived, as illustrated by Equation (15). In other words, the probabilistic formulation for training the word-dependent transition models is give by Equation (15), as follows:

$$p_{MAP}(i|i', e, I) = \frac{c(i-i'; e) + \tau \cdot p(i|i', I)}{\sum_{l=1}^{I} c(l-i'; e) + \tau} \quad \text{Equation (15)}$$

Note that for frequently used words (i.e., words that are not sparse) that have a large amount of data samples for the distortion parameters, c(d; e), the sum of $\Sigma_{l=1}^{I} c(I-i'; e)$ is large, so that $p_{MAP}(i|i', e, I)$ is dominated by the data distribution.

Conversely, rarely used words (i.e., words that are sparse) that have low counts of c(d; e), $p_{MAP}(i|i', e, I)$ will approach a typical word independent model. On the other hand, for the same word, when a small tuning parameter, $\tau$, is used, a weak prior distribution is applied, and the transition probability is more dependent on the training data of that word. Further, when $\tau$ becomes larger and larger, a stronger prior knowledge is applied, and the word-dependent transition model will approach the performance of a word-independent transition model. Therefore, in various embodiments, the parameter $\tau$ is varied control the contribution of the prior distribution in model training in order to tune word alignment performance of the word-dependent transition model.

For example, in various tested embodiments, the value of $\tau$ was varied in a range from 0 to 100,000. Note that when $\tau$ is zero, the resulting word-dependent transition models perform like an ML trained word-dependent transition model. Consequently, with $\tau=0$, due to the aforementioned sparse data problem, the resulting transition model is poorly estimated, thereby leading to a high alignment error rate in actual translations.

However, when increasing $\tau$ to a larger value, a stronger prior is applied, thereby resulting in a more robust word-dependent transition model that has been observed to significantly outperform the models used in conventional HMM based word alignment models. On the other hand, if the value of $\tau$ is set too high, MAP based word-dependent transition model training becomes over-dominated by the prior distribution, with the result that the performance begins to degrade toward that of a conventional HMM based word alignment model.

Figure 3:
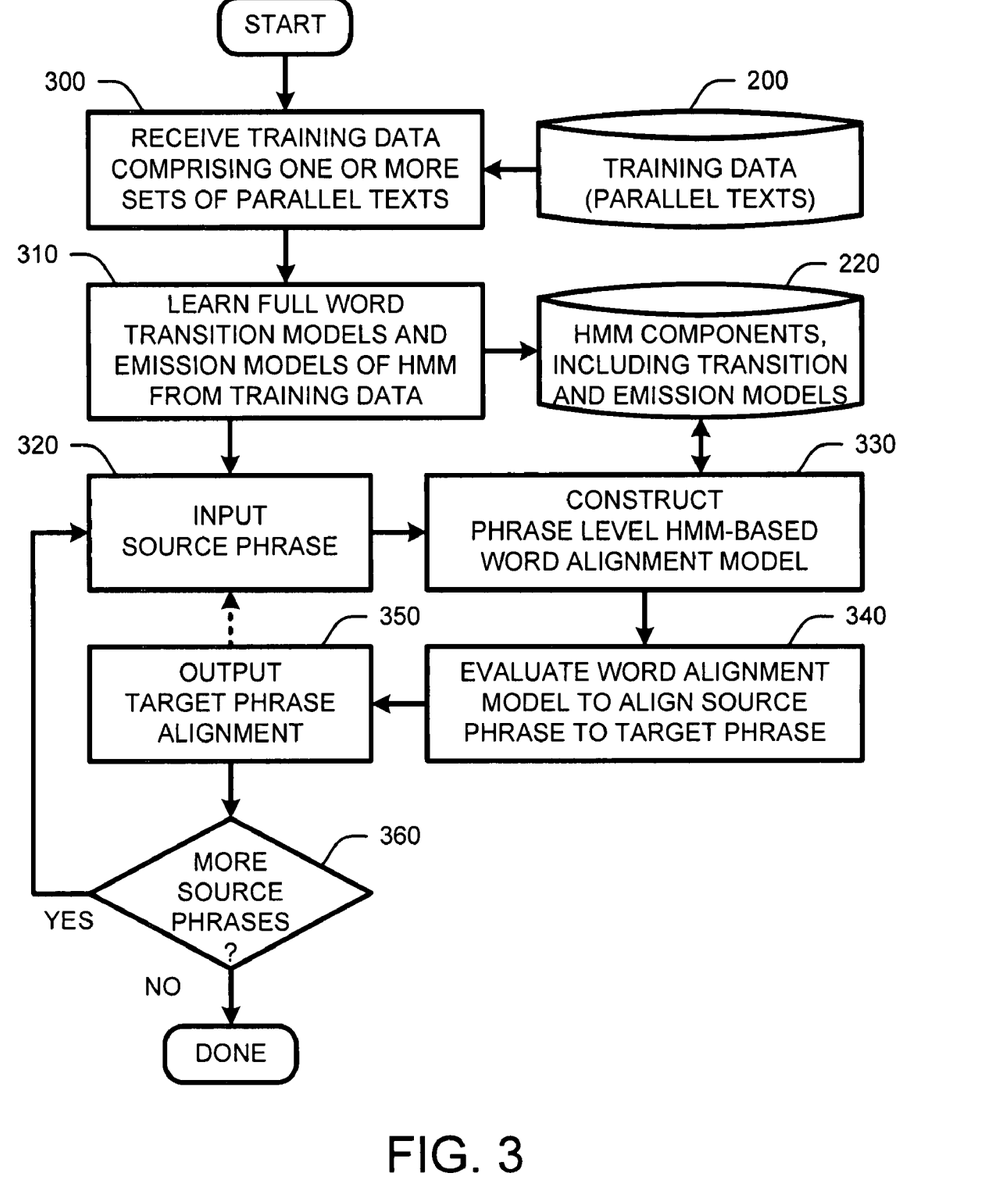
FIG. 3 illustrates a general system flow diagram that illustrates exemplary methods for implementing various embodiments of the word alignment modeler, as described herein.

3.0 Operation:

The processes described above with respect to FIG. 2 and in further view of the detailed description provided above in Sections 1 and 2 are illustrated by the general operational flow diagram of FIG. 3. In particular, FIG. 3 provides an exemplary operational flow diagram which illustrates operation of several embodiments of the word alignment modeler. Note that FIG. 3 is not intended to be an exhaustive representation of all of the various embodiments of the word alignment modeler described herein, and that the embodiments represented in FIG. 3 are provided only for purposes of explanation.

Further, it should be noted that any boxes and interconnections between boxes that are represented by broken or dashed lines in FIG. 3 represent optional or alternate embodiments of the word alignment modeler described herein, and that any or all of these optional or alternate embodiments, as described below, may be used in combination with other alternate embodiments that are described throughout this document.

In general, as illustrated by FIG. 3, the word alignment modeler begins operation by receiving 300 training data 200 comprising one or more sets of parallel texts. As described above, these parallel texts are basically two sets of texts, either in different languages or in the same language, that have known matches between words and phrases in each of the parallel texts.

Given the training data 200, the word alignment modeler then learns 310 full word-dependent transition models and other HMM components 220 from the training data using the probabilistic learning techniques described above in Section 2. Further, as described above, in the case of sparse data, i.e., rarely used words, the prior probabilities can be adjusted using a tuning parameter to improve overall model performance.

Once learned, the word-dependent transition models 220 are then used in combination with input source phrases 320 to construct 330 phrase level HMM based word alignment models for each input phrase. As described above, the HMM based word alignment models are constructed 300 such that the known input source phrase emits the probabilistic target phrase. In other words, the HMM is built on the source side, while observations are generated on the target side. In general, this alignment observation is accomplished by evaluating 340 the word alignment model to align the source phrase to the target phrase.

The result of this alignment is the output target phrase 350 that is then either provided to the user in one or more formats (text, speech, etc.), stored for later use, or provided back to the system as a new input source phrase 320 in the case where the word alignment modeler is performing multi-stage translations as described above in Section 1.2

The processes described above (from steps 320 through 350) then repeat 360 for as long as there are more source phrases to be evaluated.

Figure 4:
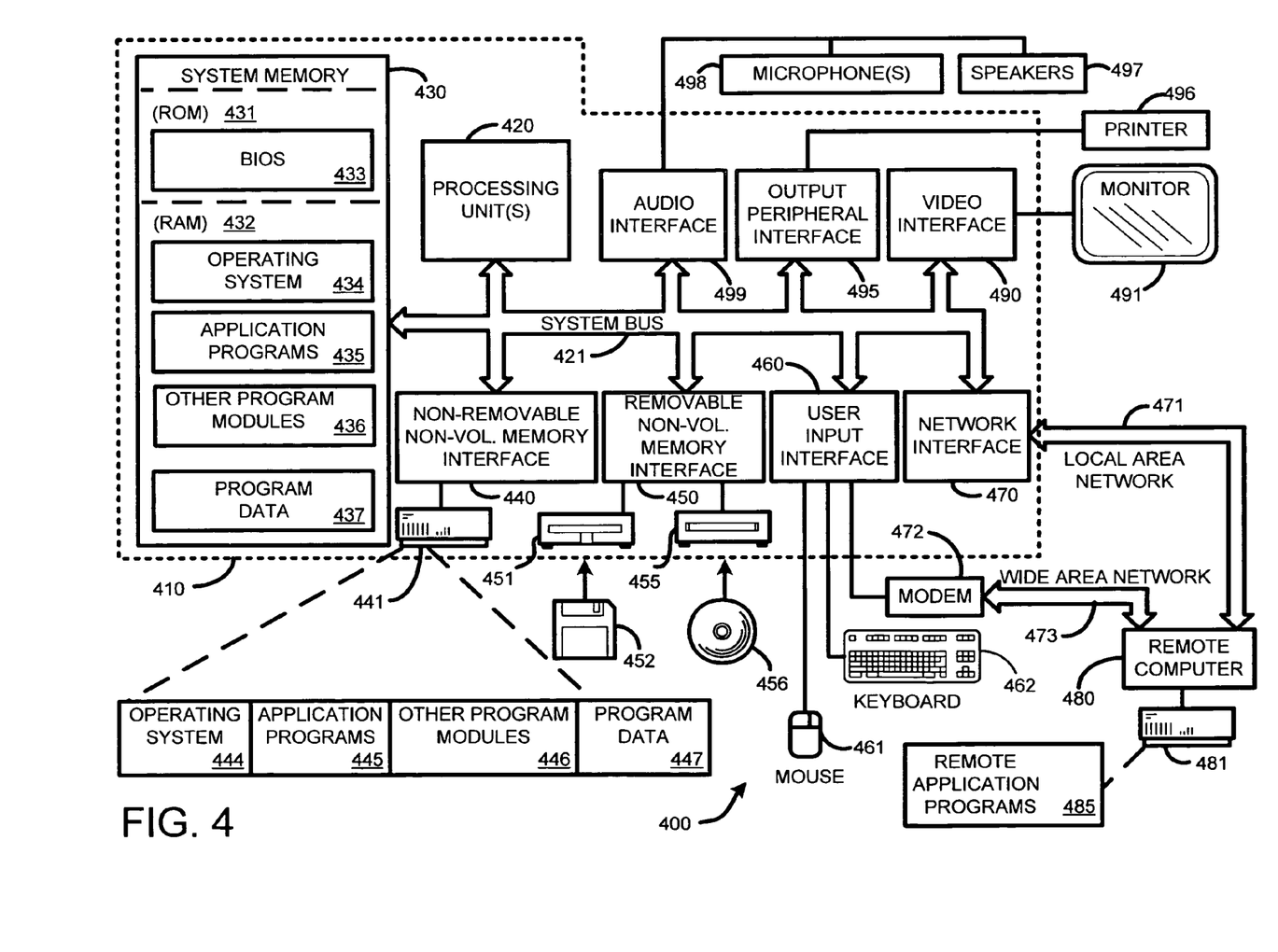
FIG. 4 is a general system diagram depicting a general-purpose computing device constituting an exemplary system for implementing various embodiments of the word alignment modeler, as described herein.
Figure 5:
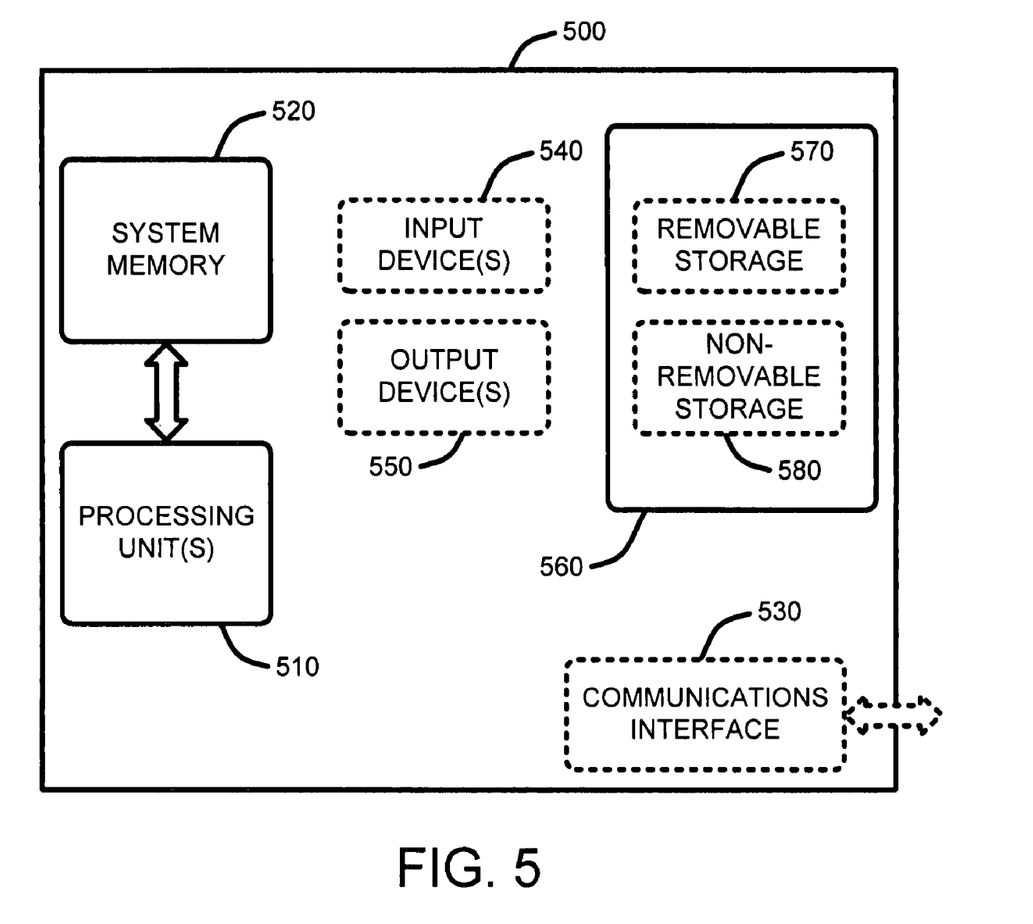
FIG. 5 is a general system diagram depicting a general computing device having simplified computing and I/O capabilities for use in implementing various embodiments of the word alignment modeler, as described herein.

4.0 Exemplary Operating Environments:

FIG. 4 and FIG. 5 illustrate two examples of suitable computing environments on which various embodiments and elements of a word alignment modeler, as described herein, may be implemented.

For example, FIG. 4 illustrates an example of a suitable computing system environment 400 on which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 498. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 4, an exemplary system for implementing the invention includes a general-purpose computing device in the form of a computer 410.

Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media such as volatile and nonvolatile removable and non-removable media implemented in any method or technology for storage of information such as computer readable instructions, data structures, program modules, or other data.

For example, computer storage media includes, but is not limited to, storage devices such as RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 420 through a wired or wireless user input interface 460 that is coupled to the system bus 421, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 410 may also include a speech or audio input device, such as a microphone or a microphone array 498, as well as a loudspeaker 497 or other sound output device connected via an audio interface 499, again including conventional wired or wireless interfaces, such as, for example, parallel, serial, USB, IEEE 1394, Bluetooth™, etc.

A monitor 491 or other type of display device is also connected to the system bus 421 via an interface, such as a video interface 490. In addition to the monitor, computers may also include other peripheral output devices such as a printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device, or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets, and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

With respect to FIG. 5, this figure shows a general system diagram showing a simplified computing device. Such computing devices can be typically be found in devices having at least some minimum computational capability in combination with a communications interface, including, for example, cell phones PDA's, dedicated media players (audio and/or video), etc. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

At a minimum, to allow a device to implement the word alignment modeler, the device must have some minimum computational capability, and some memory or storage capability. In particular, as illustrated by FIG. 5, the computational capability is generally illustrated by processing unit(s) 510 (roughly analogous to processing units 420 described above with respect to FIG. 4). Note that in contrast to the processing unit(s) 420 of the general computing device of FIG. 4, the processing unit(s) 510 illustrated in FIG. 5 may be specialized (and inexpensive) microprocessors, such as a DSP, a VLIW, or other micro-controller rather than the general-purpose processor unit of a PC-type computer or the like, as described above.

In addition, the simplified computing device of FIG. 5 may also include other components, such as, for example one or more input devices 540 (analogous to the input devices described with respect to FIG. 4). The simplified computing device of FIG. 5 may also include other optional components, such as, for example one or more output devices 550 (analogous to the output devices described with respect to FIG. 4). Finally, the simplified computing device of FIG. 5 also includes storage 560 that is either removable 570 and/or non-removable 580 (analogous to the storage devices described above with respect to FIG. 4).

The foregoing description of the word alignment modeler has been presented for the purposes of illustration and description. It is not intended to be exhaustive or to limit the invention to the precise form disclosed. Many modifications and variations are possible in light of the above teaching.

Further, it should be noted that any or all of the aforementioned alternate embodiments may be used in any combination desired to form additional hybrid embodiments of the word alignment modeler. It is intended that the scope of the invention be limited not by this detailed description, but rather by the claims appended hereto.

What is claimed is:

1. A method for estimating an alignment between words in a source phrase and words in a target phrase for constructing a word alignment model, comprising:
    providing at least one set of probabilistic word-dependent transition models, said word-dependent transition models having been automatically learned from at least one training data set comprising known parallel texts representing a source language and a target language;
    each word-dependent transition model models source word transition probabilities as a combination of a self-jump probability of a particular source language word and probabilities of jumping from that word to other particular source language words;
    providing a source phrase in the source language and selecting a corresponding word-dependent transition model for each word in the source phrase;
    constructing a Hidden Markov Model (HMM) on the source phrase from the probabilistic word-dependent transition models for each word of the source phrase in combination with other HMM components including word emission models;
    evaluating the HMM to determine an alignment between the source phrase and a target phrase in the target language; and
    storing the alignment between the source phrase and the target phrase to a computer-readable storage device as an entry in a learned word alignment model.

2. The method of claim 1 further comprising using Bayesian learning for estimating parameters of the word-dependent transition models using maximum a posteriori (MAP) training for words that are sparsely represented in the training data set.

3. The method of claim 2 further comprising an adjustable tuning parameter for adjusting a prior distribution of the word-dependent transition model for one or more of the sparsely represented words.

4. The method of claim 1 further comprising generating a string of one or more words in the target language by evaluating the alignment between the source phrase and the target phrase, thereby providing a translation of the source phrase to a corresponding phrase in the target language.

5. The method of claim 1 further comprising providing the source phrase by receiving a text based document.

6. The method of claim 1 further comprising providing the source phrase through speech recognition of a speech signal.

7. The method of claim 1 further comprising selecting a language of the source language from a set of available source languages corresponding to one set of the learned probabilistic word-dependent transition models.

8. The method of claim 1 further comprising selecting a language of the target language from a set of available target languages corresponding to one set of the learned probabilistic word-dependent transition models.

9. A computer-readable storage device having computer executable instructions stored thereon for determining a probabilistic mapping between a source phrase and a target phrase, comprising instructions for:

providing an automatically learned word-dependent transition model for each source language word in a training set comprising known parallel texts in a source language and a target language;
each word-dependent transition model models source word transition probabilities as a combination of a self-jump probability of a particular source language word and probabilities of jumping from that word to other particular source language words;
receiving a source phrase in the source language;
selecting a corresponding one of the word-dependent transition models for each word in the source phrase;
constructing a source phrase based Hidden Markov Model (HMM) including the selected word-dependent transition models; and
determining a probabilistic mapping between the source phrase and a target phrase in the target language by evaluating the HMM.

10. The computer-readable storage device of claim 9 further comprising instructions for using Bayesian learning for estimating parameters of the word-dependent transition models using maximum a posteriori (MAP) training for words that are sparsely represented in the training set.

11. The computer-readable storage device of claim 10 further comprising instructions for providing an adjustable tuning parameter for adjusting a prior distribution of the word-dependent transition models for sparsely represented words.

12. The computer-readable storage device of claim 9 further comprising instructions for generating a translation from the source phrase to the target language by using the probabilistic mapping between the source phrase and a target phrase to construct a string of words in the target language.

13. The computer-readable storage device of claim 9 further comprising instructions for parsing a text based document for receiving the source phrase.

14. The computer-readable storage device of claim 9 further comprising instructions for performing speech recognition of a speech signal for receiving the source phrase.

15. The computer-readable storage device of claim 9 further comprising instructions for receiving the source phrase via a text input device.

16. A process for mapping a source phrase in a source language to a target phrase in a target language for use in constructing a word alignment model, comprising steps for:
receiving one or more sets of automatically learned word-dependent transition models, each set of word-dependent transition models corresponding to a pair of parallel texts in a unique pair of source and target languages;
each word-dependent transition model in each set corresponding a specific one of the words in one of the parallel texts of one of the source languages;
each word-dependent transition model models source word transition probabilities as a combination of a self-jump probability of a particular source language word and probabilities of jumping from that word to other particular source language words;
selecting one of the pairs of unique source and target languages;
receiving a source phrase in the selected source language;
selecting a corresponding one of the word-dependent transition models for each word in the source phrase;
constructing a source phrase based Hidden Markov Model (HMM) including the selected word-dependent transition models and other HMM components including word emission models;
determining a probabilistic mapping between the source phrase and a target phrase in the corresponding target language by evaluating the HMM; and
storing the probabilistic mapping between the source phrase and the target phrase as an entry in a learned word alignment model.

17. The process of claim 16 further comprising using Bayesian learning for estimating parameters of the word-dependent transition models using maximum a posteriori (MAP) training for words that are sparsely represented in the pair of parallel texts of the selected pair of unique source and target languages.

18. The process claim 17 further comprising instructions for providing an adjustable tuning parameter for adjusting a prior distribution of the word-dependent transition models for sparsely represented words.

19. The process of claim 16 further comprising instructions for generating a translation from the source phrase to the target language by using the probabilistic mapping between the source phrase and the target phrase to construct a string of words in the target language.

20. The process of claim 16 further comprising providing a user interface for entering the received source phrase in the selected language.

* * * * *